US012779428B2

(12) United States Patent
Smith et al.

(10) Patent No.: US 12,779,428 B2
(45) Date of Patent: Nov. 3, 2026

(54) WHEEL ASSEMBLY INCLUDING ACTIVATED CARBON

(71) Applicant: GM GLOBAL TECHNOLOGY OPERATIONS LLC, Detroit, MI (US)

(72) Inventors: Kyle M. Smith, Milford, MI (US); Jinshuo Zhu, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 592 days.

(21) Appl. No.: 18/446,167

(22) Filed: Aug. 8, 2023

(65) Prior Publication Data

US 2025/0050308 A1 Feb. 13, 2025

(51) Int. Cl.

| | |
|---|---|
| ***B01J 20/20*** | (2006.01) |
| ***B01J 20/28*** | (2006.01) |
| ***B60C 1/00*** | (2006.01) |
| ***B60C 19/00*** | (2006.01) |

(52) U.S. Cl.

CPC ........... *B01J 20/20* (2013.01); *B01J 20/2805* (2013.01); *B01J 20/28066* (2013.01); *B60C 1/0008* (2013.01); *B60C 19/00* (2013.01)

(58) Field of Classification Search

None

See application file for complete search history.

(56) References Cited

U.S. PATENT DOCUMENTS

| | | | | |
|---|---|---|---|---|
| 2019/0202702 | A1* | 7/2019 | Wang | H01G 11/34 |
| 2021/0146724 | A1* | 5/2021 | Scheurich | B60C 5/22 |

FOREIGN PATENT DOCUMENTS

| | | | | |
|---|---|---|---|---|
| DE | 4137030 A1 | 5/1993 | | |
| DE | 4414121 A1 | 10/1995 | | |
| DE | 102018202003 A1 | 8/2019 | | |
| GB | 2496427 A * | 5/2013 | | B60B 21/026 |
| WO | WO-2013068763 A1 | 5/2013 | | |
| WO | WO-2023021300 A1 | 2/2023 | | |

OTHER PUBLICATIONS

General Carbon (Frequently Asked Questions) (https://generalcarbon.com/faq/? accessed Feb. 19, 2026) (Year: 2026).*

Office Action dated Mar. 14, 2024 from German Patent Office for German Patent No. 10 2023 132 447.0; 4pgs.

* cited by examiner

*Primary Examiner* — Elizabeth Collister

(57) ABSTRACT

A wheel assembly including: a wheel; a tire mounted to the wheel, the tire defining a cavity between an inner surface of the tire and the wheel; and activated carbon exposed to air molecules within the cavity, the activated carbon including a porous surface configured to adsorb and compact air molecules present within the cavity.

10 Claims, 5 Drawing Sheets

WHEEL ASSEMBLY INCLUDING ACTIVATED CARBON

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a wheel assembly including activated carbon.

Vehicle wheel assemblies typically include a wheel and a tire mounted to the wheel. An air cavity is defined between the tire and the wheel. Air is added to the air cavity to inflate the tire. The amount of air within the air cavity has a bearing on performance of the tire. For example, increasing tire pressure may improve handling and stability, and may increase ride stiffness.

SUMMARY

The present disclosure includes, in various features, a wheel assembly including: a wheel; a tire mounted to the wheel, the tire defining a cavity between an inner surface of the tire and the wheel; and activated carbon exposed to air molecules within the cavity, the activated carbon including a porous surface configured to adsorb and compact air molecules present within the cavity.

In further features, the activated carbon is derived from at least one of the following: coal; wood; bamboo; coconut husk; willow; peat; coir; lignite; and petroleum pitch.

In further features, the activated carbon includes charcoal that has been carbonized in an oxygen-free environment.

In further features, the activated carbon is produced from a source material by one of physical activation and chemical activation.

In further features, the activated carbon includes a surface area of at least 3,000 $m^2/g$.

In further features, the activated carbon is mounted to an inner surface of the tire.

In further features, the activated carbon is mounted to the wheel.

In further features, the activated carbon is mounted to a barrel of the wheel.

In further features, the activated carbon is within a wheel cavity defined by the wheel.

In further features, the wheel cavity is defined at a spoke of the wheel.

In further features, the activated carbon is mounted with an adhesive.

In further features, the activated carbon is mounted with a container including a mesh surface configured to permit air molecules to pass therethrough.

In further features, the activated carbon is mounted with a retainer including a micro perforated surface defining a plurality of holes configured to permit air molecules to pass therethrough.

In further features, the plurality of holes each have a circumference of 0.1 mm to 2.0 mm.

The present disclosure also includes, in various features, a wheel assembly including: a wheel including a barrel; a tire mounted to the wheel, the tire defining a cavity between an inner surface of the tire and the wheel; and activated carbon mounted to at least one of the barrel of the wheel and the tire, the activated carbon including a porous surface configured to adsorb and compact air molecules present within the cavity.

In further features, the activated carbon is mounted with an adhesive.

In further features, the activated carbon is mounted with a container defining openings configured to permit air molecules to pass therethrough.

The present disclosure also includes, in various features, a wheel assembly including: a wheel including a barrel defining an opening to a wheel cavity defined by the wheel; a tire mounted to the wheel, the tire defining an air cavity between an inner surface of the tire and the barrel; and activated carbon retained within the wheel cavity by a retention member defining openings configured to permit air molecules of the air cavity to pass therethrough, the activated carbon including a porous surface configured to adsorb and compact the air molecules of the air cavity. In further features, the wheel cavity extends to within spokes of the wheel.

In further features, the activated carbon includes a surface area of at least 3,000 $m^2/g$.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
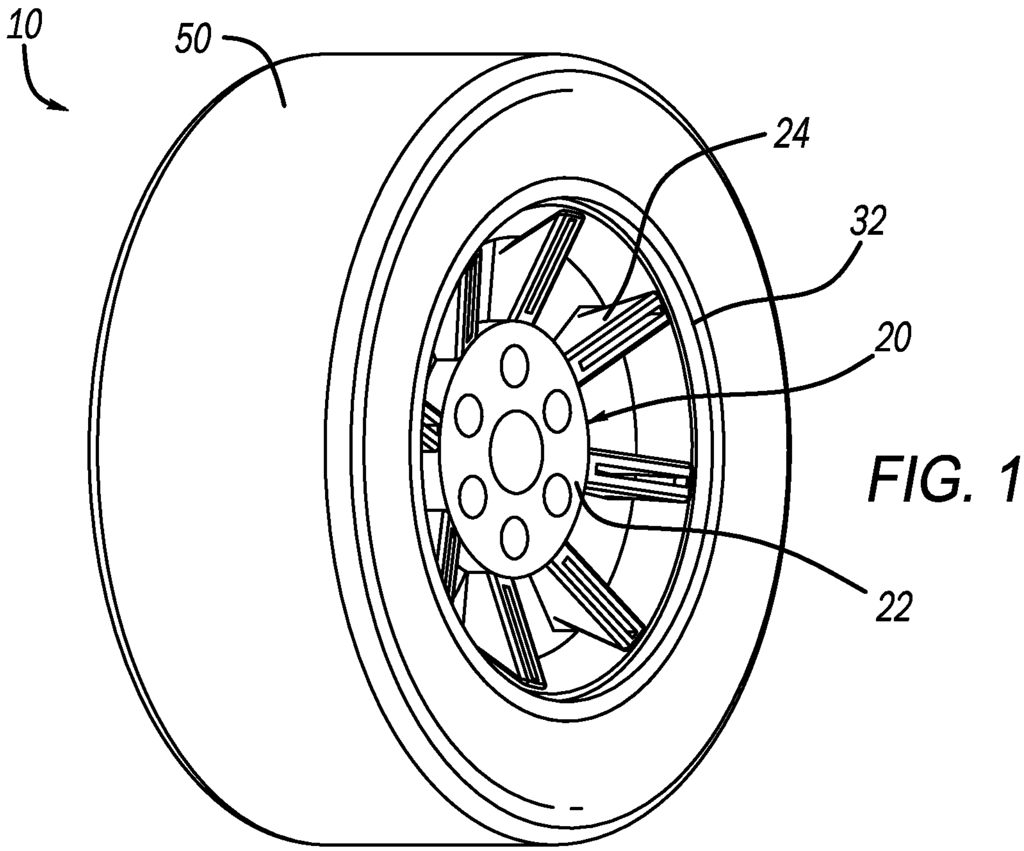
FIG. 1 is a perspective view of a wheel assembly in accordance with the present disclosure.

FIG. 1 illustrates a wheel assembly 10 in accordance with the present disclosure. The wheel assembly 10 may be configured for installation in any suitable vehicle, such as any suitable passenger vehicle, commercial vehicle, mass transit vehicle, utility vehicle, military vehicle, construction vehicle, trailer, etc. The wheel assembly 10 may be configured for use in any suitable nonvehicular application as well. For example, the wheel assembly 10 may be configured for use with any suitable construction equipment, manufacturing equipment, transport equipment, military equipment, etc.

Figure 2:
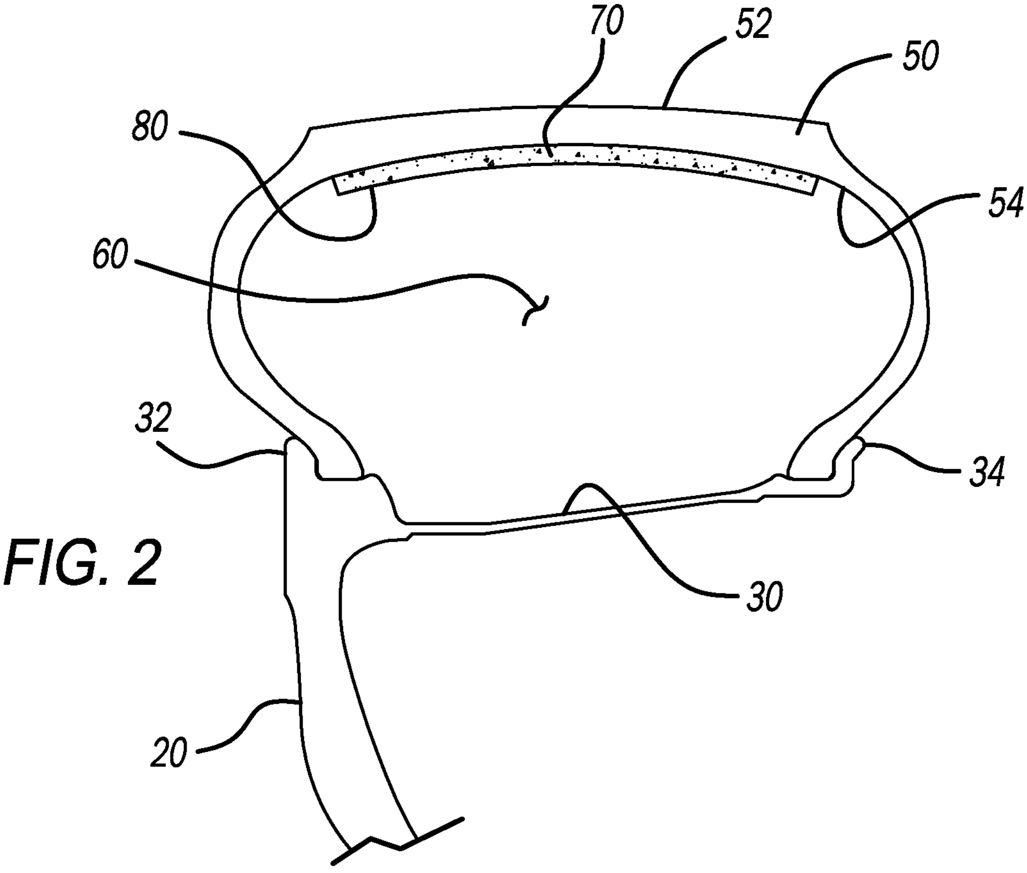
FIG. 2 is a cross-sectional view of the wheel assembly of FIG. 1.
Figure 3:
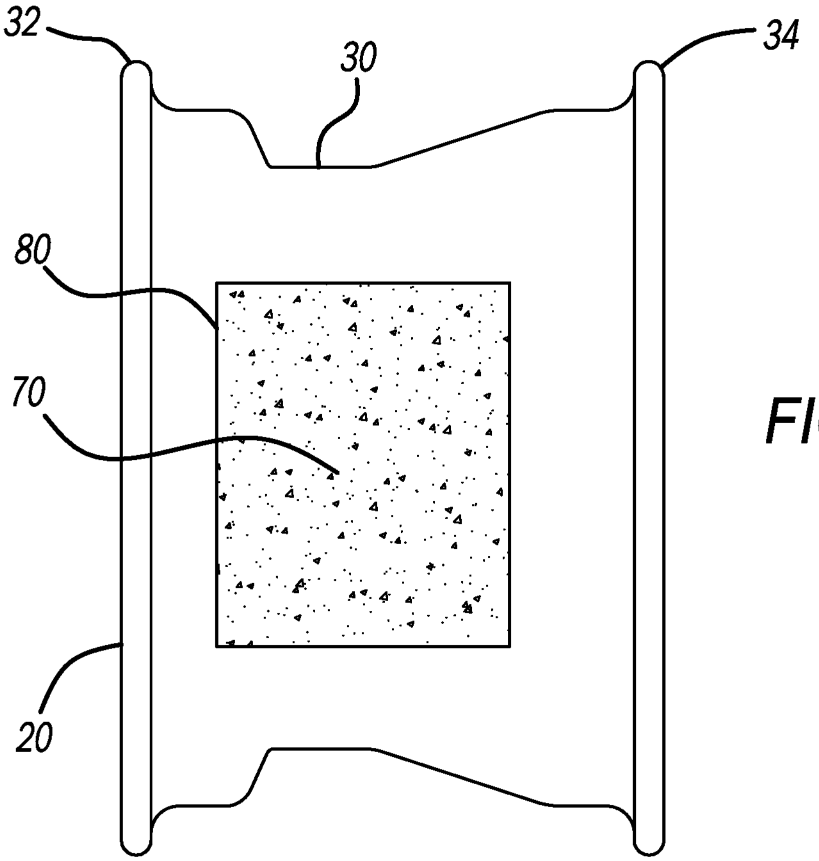
FIG. 3 illustrates a wheel of the wheel assembly of FIG. 1 without a tire mounted thereto, the wheel including activated carbon mounted in accordance with the present disclosure.
Figure 4:
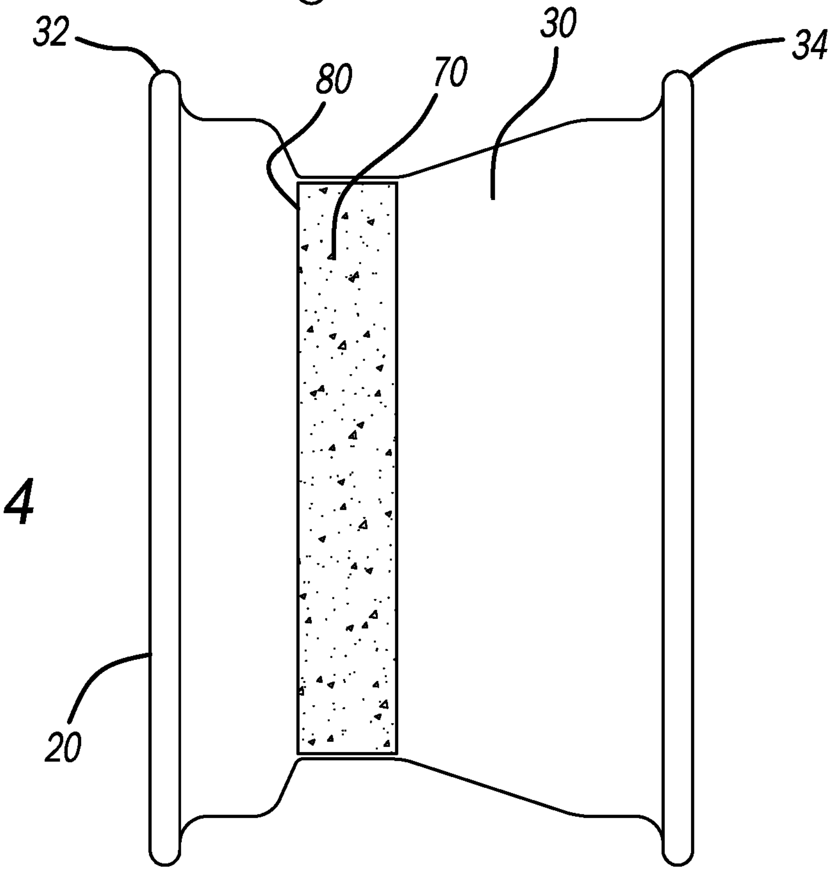
FIG. 4 illustrates a wheel of the wheel assembly of FIG. 1 without the tire mounted thereto, the wheel including activated carbon mounted in another configuration in accordance with the present disclosure.

The wheel assembly 10 generally includes a wheel 20 and a tire 50 configured to be mounted to the wheel 20. The wheel 20 includes a hub 22 at a center of the wheel 20. A plurality of spokes 24 extend outward from the hub 22 to a barrel 30, which is illustrated in FIGS. 2-4, for example. The barrel 30 is circular, and is between an outer rim 32 and an inner lip 34 of the wheel 20. The tire 50 is seated between the outer rim 32 and the inner lip 34.

With particular reference to FIG. 2, for example, the tire 50 includes an outer surface 52 and an inner surface 54, which is opposite to the outer surface 52. The outer surface 52 includes treads, and is configured to interact with a road surface that the wheel assembly 10 is seated on. The tire 50 defines an air cavity 60 between the inner surface 54 of the tire 50 and the wheel 20. More specifically, the air cavity 60 is defined between the inner surface 54 of the tire 50 and the barrel 30 of the wheel 20. The tire 50 is inflated with air molecules within the air cavity 60. The air molecules may be added to the air cavity 60 through any suitable air valve at any suitable pressure.

With continued reference to FIGS. 1 and 2, and additional reference to FIGS. 3-6, the wheel assembly 10 includes activated carbon 70. The activated carbon 70 may be derived from any suitable carbon source material, such as, but not limited to, the following: coal; wood; bamboo; coconut husk; willow, peat; coir; lignite; and petroleum pitch. The activated carbon may also include charcoal that has been carbonized in an oxygen-free environment. The activated carbon 70 may be produced (i.e., activated) from the carbon source using any suitable processing. Suitable processes include, but are not limited to, physical activation and chemical activation. With respect to physical activation, the source material is made into activated carbon by subjecting the source material to any suitable hot gas. Air is then introduced to burn out the gas, which creates a graded, screened, and de-dusted form of activated carbon. This is performed by, for example, a carbonization or activation/oxidation process. With respect to the carbonization process, material with carbon content is pyrolyzed at temperatures in the range of 600° C.-900° C. in an inert atmosphere with gases such as argon or nitrogen, for example. With respect to the activation/oxidation process, the raw source material, or source material that has been carbonized, is exposed to oxidizing atmospheres (oxygen or steam) at temperatures above 250° C. (such as in the range of 600-1200° C.). The activation is performed by heating the sample for one hour in a muffle furnace at 450° C. in the presence of air.

With respect to chemical activation, the carbon source is impregnated with suitable chemicals, such as an acid, strong base, or a salt (phosphoric acid 25%, potassium hydroxide 5%, sodium hydroxide 5%, potassium carbonate 5%, calcium chloride 25%, and zinc chloride 25%). The carbon is then subjected to high temperatures, such as 250° C.-600° C. The high temperature likely activates the carbon by forcing the carbon material to open and have an increased number of microscopic pores, which increase the surface area of the activated carbon 70. For example, the activated carbon 70 may have a surface area of at least 3,000 $m^2/g$.

The activated carbon 70 may take any suitable form, such as powdered activated carbon, granular activated carbon, extruded activated carbon, bead activated carbon, impregnated carbon, polymer coated carbon, woven carbon, etc. The activated carbon 70 may also be configured as larger slabs exposed to the air molecules within the air cavity 60. Further, the activated carbon 70 may be made in particulate form as a powder or fine granules less than 1.0 millimeters in size, with an average diameter between 0.15 and 0.25 millimeters.

The activated carbon 70 is generally a microporous inert carbon matrix with a very large internal surface area (700-3,000 $m^2/g$, or greater). The internal surface area is configured for adsorption of air molecules present within the air cavity 60. The activated carbon 70 is formed by way of a thermal process, where volatile components are removed from the carbon-laden material (raw material) in the presence of oxygen. By way of specific treatments, such as the physical and chemical activation described above, a particular pore structure is created, which determines the adsorption capacity and adsorption properties of the activated carbon 70.

The activated carbon 70 may be mounted at any suitable position about the wheel assembly 10 as long as the activated carbon 70 is exposed to the air molecules within the air cavity 60. In the example of FIG. 2, the activated carbon 70 is mounted to the inner surface 54 of the tire 50 with any suitable adhesive 80. The activated carbon 70 may be mounted intermittently about the inner surface 54, or in a manner such that the activated carbon 70 extends entirely around the inner surface 54 of the tire 50.

In the example of FIG. 3, the activated carbon 70 is mounted to the barrel 30 using any suitable adhesive 80. The activated carbon 70 is configured as generally a square-shaped patch attached to the barrel 30. Any suitable number of such patches of the activated carbon 70 may be mounted around the barrel 30. In the example of FIG. 4, the activated carbon 70 is arranged in a more narrow strip, which may extend entirely around the wheel 20, or may be arranged in multiple narrow strips spaced apart about the barrel 30.

Figure 5:
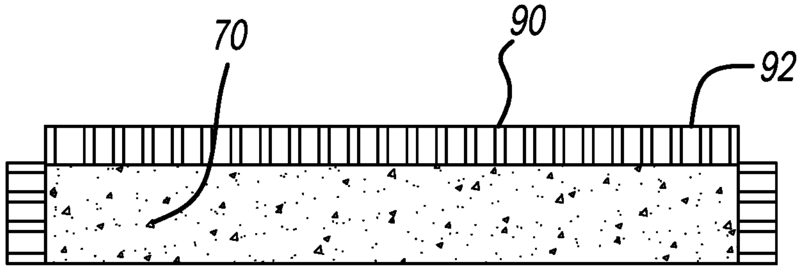
FIG. 5 illustrates activated carbon of the wheel assembly secured in place with a retention member.

With reference to FIG. 5, the activated carbon 70 may be mounted with any suitable retainer 90 configured to be mounted to the inner surface 54 of the tire 50 or at any suitable position about the wheel 20, such as on the barrel 30. The retainer 90 may take the place of the adhesive 80, or be included along with the adhesive. The retainer 90 may be made of any suitable material, such as any suitable metallic or plastic material. The retainer 90 is mounted to the tire 50 or the wheel 20 in any suitable manner, such as with any suitable adhesive and/or mechanical coupling. The retainer 90 defines a plurality of openings 92 through which the molecules of air within the air cavity 60 may pass in order to contact the activated carbon 70 and become adsorbed by the porous outer surface of the activated carbon 70. The openings 92 may have any suitable circumference, such as, but not limited to, 0.1-2.0 millimeters. The activated carbon 70 may also be held in place with any suitable mesh material (or other material defining holes, micro-perforations, or other openings) configured to permit air molecules to pass therethrough.

Figure 6:
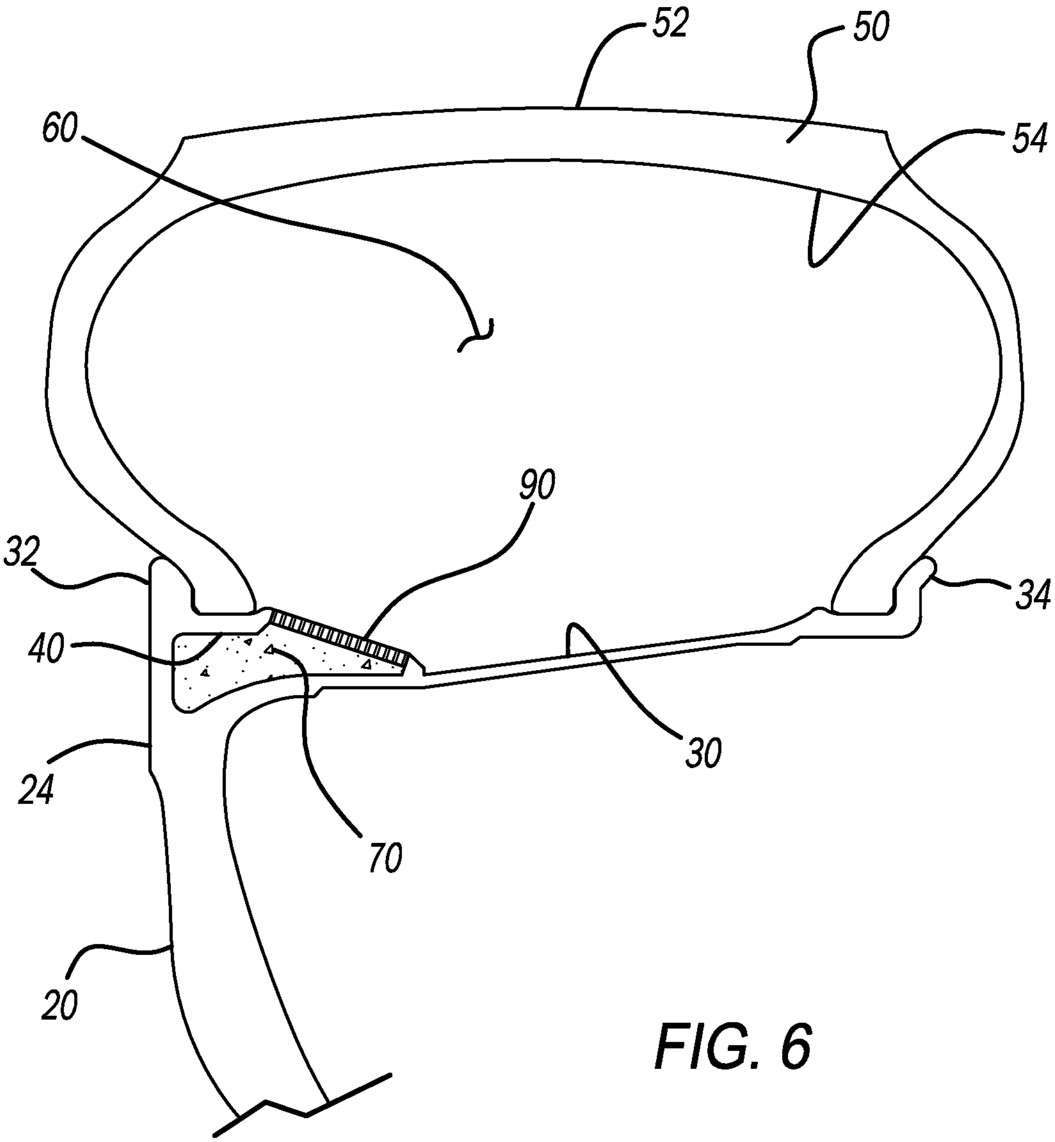
FIG. 6 is a cross-sectional view of a wheel assembly in accordance with the present disclosure, the wheel assembly defining a wheel cavity housing activated carbon.

In the example of FIG. 6, the wheel 20 defines a wheel cavity 40 in which the activated carbon 70 may be seated. The wheel cavity 40 may be located at any suitable position about the wheel 20, such as within one or more of the spokes 24. The wheel cavity 40 is in fluid communication with the air cavity 60. Thus, activated carbon 70 within the wheel cavity 40 is exposed to air molecules within the air cavity 60.

Any suitable number of wheel cavities 40 may be defined about the wheel 20. The activated carbon 70 may be retained within the wheel cavity 40 in any suitable manner, such as with the retainer 90. The retainer 90 extends across the opening of the wheel cavity 40. Air molecules from the air cavity 60 flow through the openings 92 of the retainer 90 into cooperation with the activated carbon 70, where the air molecules are adsorbed by the activated carbon 70.

Figure 7:
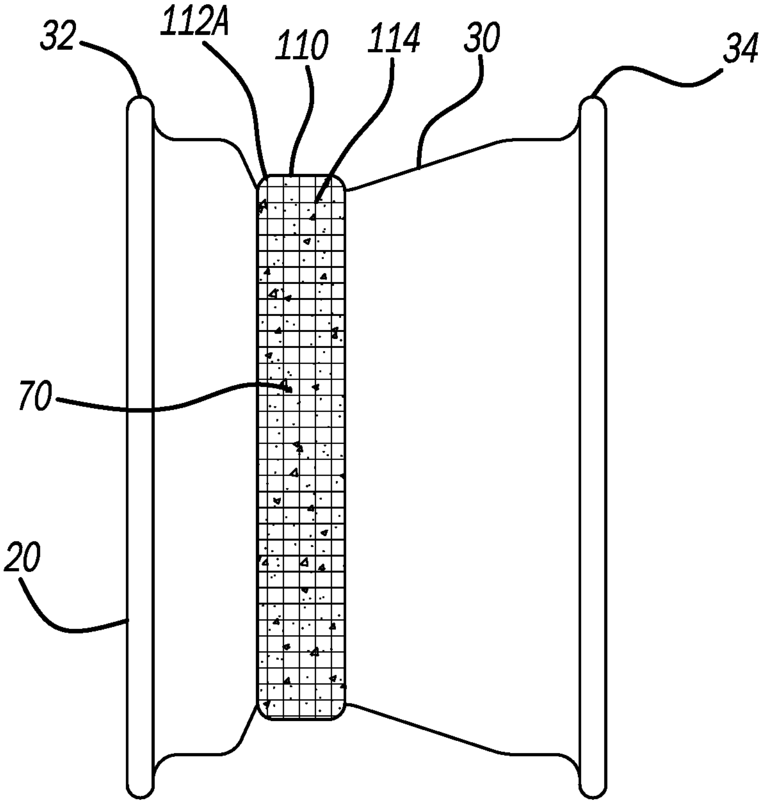
FIG. 7 illustrates a wheel of the wheel assembly of FIG. 1 without the tire mounted thereto, the wheel including a container filled with activated carbon.
Figure 8:
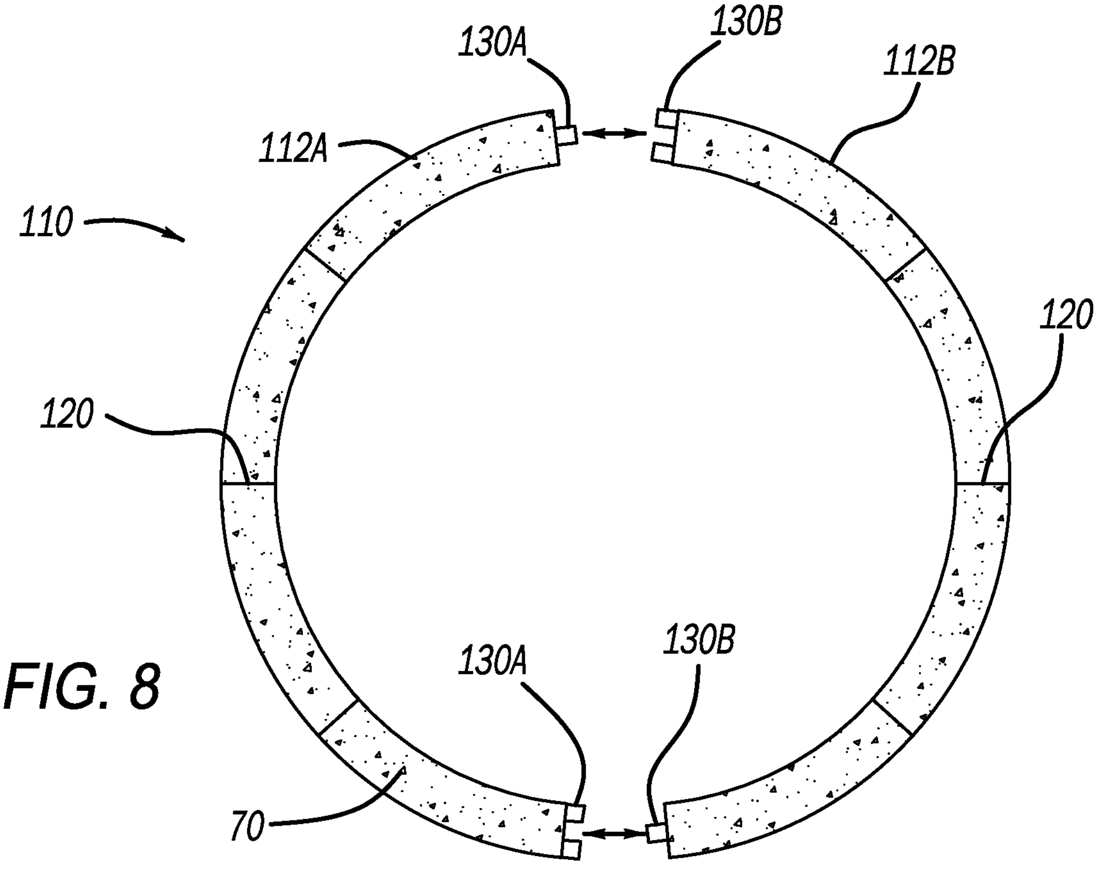
FIG. 8 is a side view of the container of FIG. 7.

In the example of FIGS. 7 and 8, the activated carbon 70 may be housed in a container 110. The container 110 may include two or more portions, such as to facilitate attachment to the wheel 20. For example and as illustrated in FIG. 8, the container 110 may include a first portion 112A and a second portion 112B. Both the first portion 112A and the second portion 112B include a mesh 114, which is configured to retain the activated carbon 70 within the container 110, and also configured to permit air molecules to pass through the mesh 114 to be adsorbed by the activated carbon 70. Dividers 120 are included within both the first portion 112A and the second portion 112B to keep the activated carbon 70 evenly distributed about the container 110. The first portion 112A and the second portion 112B may be coupled together in any suitable manner to facilitate placement around the wheel 20. For example, the first portion 112A may include first coupling members 130A configured to couple with second coupling members 130B of the second portion 112B. The container 110 may be secured to the wheel 20 in any suitable manner, such as with or without an adhesive.

Figure 9:
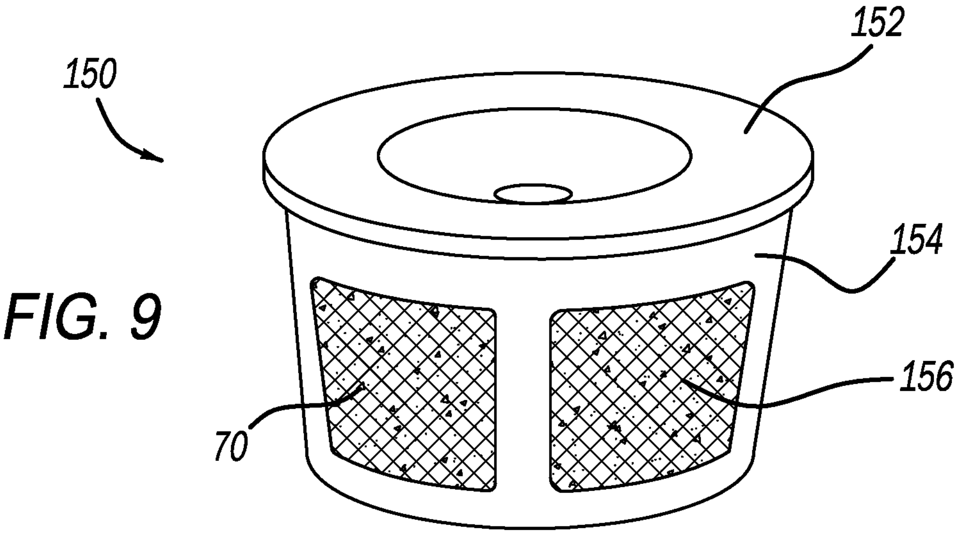
FIG. 9 is a perspective view of another container filled with activated carbon, the container configured to be mounted to the wheel assembly.
Figure 10:
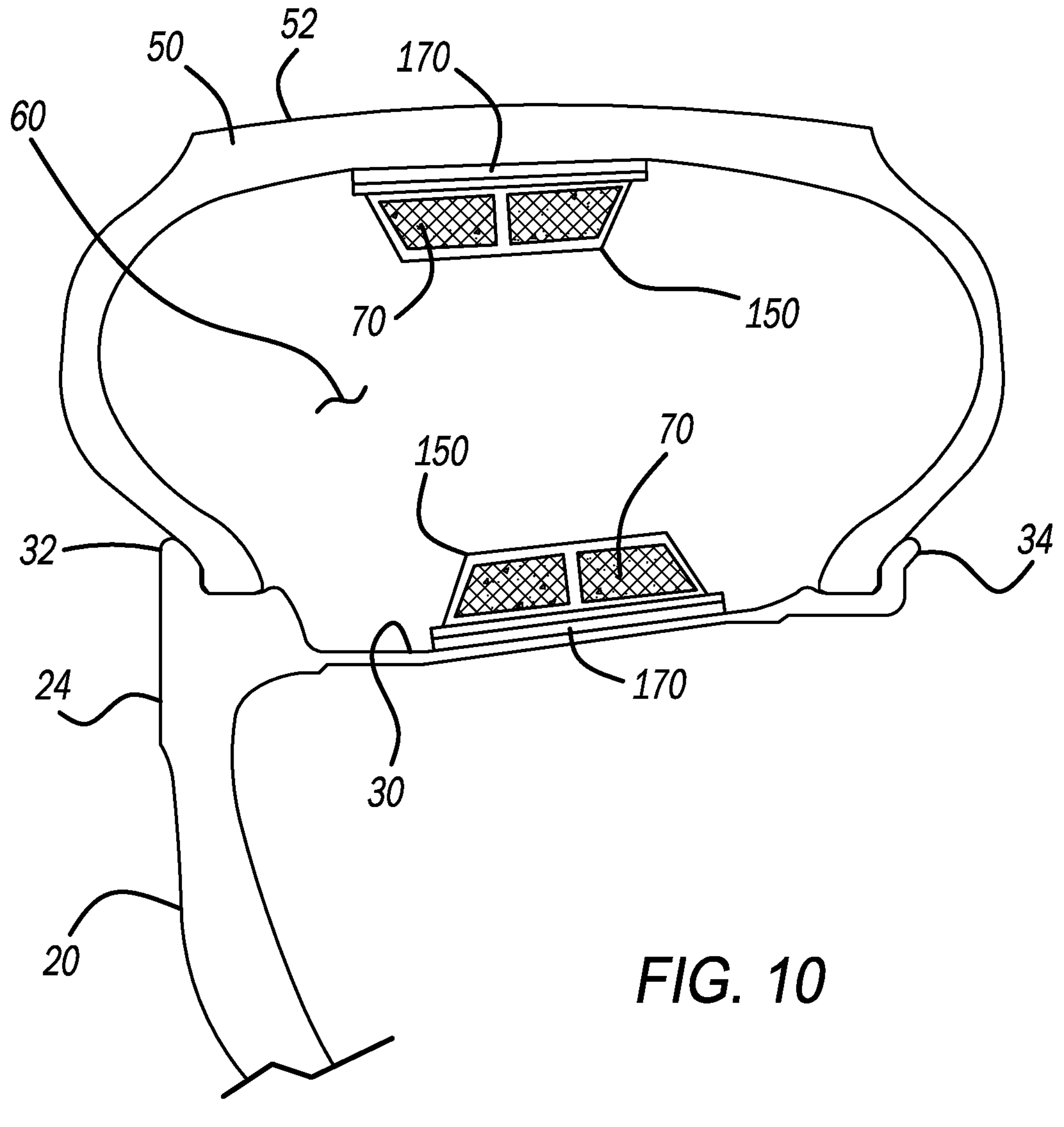
FIG. 10 is a cross-sectional view of the wheel assembly including two of the containers of FIG. 9.

FIGS. 9 and 10 illustrate another container 150 in accordance with the present disclosure for housing the activated carbon 70. The container 150 includes a base 152 configured to be mounted at any suitable position about the wheel assembly 10 where the activated carbon 70 will be exposed to air molecules within the air cavity 60. The container 150 further includes a body 154 with one or more portions of mesh 156 configured to retain the activated carbon 70 within the body 154, and configured to allow air molecules to pass through the mesh 156 to be adsorbed by the activated carbon 70. In the example of FIG. 10, one container 150 is adhered to the tire 50 with any suitable adhesive 170, and another container 150 is mounted to the barrel 30 with the adhesive 170. Although FIG. 10 illustrates two containers 150, any suitable number of containers 150 may be included, such as a single container 150 or more than two containers 150.

The activated carbon 70 is configured to adsorb air molecules of the air cavity 60, which compacts the air molecules of the air cavity 60, thereby increasing the air capacity of the air cavity 60. By adsorbing air molecules into the porous surface of the activated carbon 70, the tire 50, and the overall wheel assembly 10, acts as if the air cavity 60 has a larger internal volume than its actual volume, which reduces vertical stiffness of the tire 50 and enables improved ride comfort and isolation. For example, the tire 50 feels softer, thereby improving ride comfort. By increasing the effective internal air volume of the air cavity 60, activated carbon 70 also reduces tire cavity noise, which provides a quieter driving experience. The activated carbon 70 effectively softens the ride and improves ride quality when air pressure of the air cavity 60 is increased, such as to support relatively heavy loads and/or to enhance handling.

As air pressure within the air cavity 60 is increased, additional air molecules are adsorbed by the activated carbon 70. The atoms of carbon included with the activated carbon 70 project attractive forces outward from the porous surfaces thereof. These very short-range forces, known as Van der Waals forces, attract the molecules of the surrounding air within the air cavity 60. The combination of these attractive forces and the air molecules in the air cavity 60 results in adsorption of molecules at the surface of the activated carbon 70.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A wheel assembly comprising:

a wheel;

a tire mounted to the wheel, the tire defining a cavity between an inner surface of the tire and the wheel;

a container inside of the cavity, the container including a base mounted to the inner surface of the tire and a body having mesh sidewalls configured to allow air molecules of the cavity to pass through the mesh sidewalls; and activated carbon within the container and exposed to air molecules that have passed into the container through the mesh sidewalls, the activated carbon including a porous surface configured to adsorb and compact air molecules.

2. The wheel assembly of claim 1, wherein the activated carbon is derived from at least one of the following: coal; wood; bamboo; coconut husk; willow; peat; coir; lignite; and petroleum pitch.

3. The wheel assembly of claim 1, wherein the activated carbon includes charcoal that has been carbonized in an oxygen-free environment.

4. The wheel assembly of claim 1, wherein the activated carbon is produced from a source material by one of physical activation and chemical activation.

5. The wheel assembly of claim 1, wherein the activated carbon includes a surface area of at least 3,000 $m^2/g$.

6. The wheel assembly of claim 1, wherein the base is mounted to the inner surface of the tire with an adhesive.

7. A wheel assembly comprising:

a wheel including a barrel;

a tire mounted to the wheel, the tire defining a cavity between an inner surface of the tire and the wheel;

a container inside of the cavity, the container including a base mounted to the inner surface of the tire and a body having mesh sidewalls configured to allow air molecules of the cavity to pass through the mesh sidewalls; and activated carbon within the container and exposed to air molecules that have passed into the container through the mesh sidewalls, the activated carbon including a porous surface configured to adsorb and compact air molecules.

8. The wheel assembly of claim 7, wherein the base is mounted to the inner surface of the tire with an adhesive.

9. A wheel assembly comprising:

a wheel including a barrel defining an opening to a wheel cavity defined by the wheel;

a tire mounted to the wheel, the tire defining an air cavity between an inner surface of the tire and the barrel;

a container inside of the air cavity, the container including a base mounted to the inner surface of the tire and a body having mesh sidewalls configured to allow air molecules of the air cavity to pass through the mesh sidewalls; and activated carbon retained within the container and exposed to air molecules that have passed into the container through the mesh sidewalls, the activated carbon including a porous surface configured to adsorb and compact the air molecules of the air cavity.

10. The wheel assembly of claim 9, wherein the activated carbon includes a surface area of at least 3,000 $m^2/g$.

* * * * *